United States Patent [19]

Felstehausen

[11] Patent Number: 5,195,929
[45] Date of Patent: Mar. 23, 1993

[54] COB CUTTER BLADE AND METHOD OF MANUFACTURE

[75] Inventor: Eugene F. Felstehausen, Hoopeston, Ill.

[73] Assignee: Felste Co., Inc., Hoopeston, Ill.

[21] Appl. No.: 580,166

[22] Filed: Sep. 10, 1990

[51] Int. Cl.$^5$ .............................................. A01F 11/06
[52] U.S. Cl. ........................................ 460/48; 460/54; 460/56; 460/57
[58] Field of Search ................. 460/48, 53, 54, 55, 460/56, 57, 49

[56] References Cited

U.S. PATENT DOCUMENTS

| | | | |
|---|---|---|---|
| 1,282,790 | 10/1918 | Fenn | 460/54 X |
| 1,828,648 | 10/1931 | Douthitt | 460/56 X |
| 1,973,672 | 9/1934 | Osgood | 460/57 X |
| 2,216,065 | 9/1940 | Cover | 460/57 X |
| 2,323,092 | 6/1943 | Kerr | 130/9 |
| 2,787,273 | 2/1957 | Kerr | 130/9 |
| 2,792,839 | 5/1957 | Sheridan | 460/54 |
| 3,455,307 | 6/1969 | Ross | 130/9 |
| 4,802,495 | 2/1989 | Maruska | 130/9 B |
| 4,943,259 | 7/1990 | Felstehausen | 460/52 |
| 5,041,057 | 8/1991 | Felstehausen | 460/53 |

Primary Examiner—William P. Neuder
Attorney, Agent, or Firm—Don W. Weber

[57] ABSTRACT

A new and unique construction for a corn cob cutter knife is presented. A method is described for the manufacture of a unique cutting blade insert which is tapered and which has an inner ski angle compatible with the many applications involved in removing corn kernels from a corn cob in a mechanized operation. The unique removable cutting blade insert is designed so that the various angles of declination and attack optimize the sharpness and long lasting nature of the knife. A method is also presented to determine the off-set grinding radius for the ski angle of the knife. A unique square bushing for the control of the knife is also provided.

6 Claims, 2 Drawing Sheets

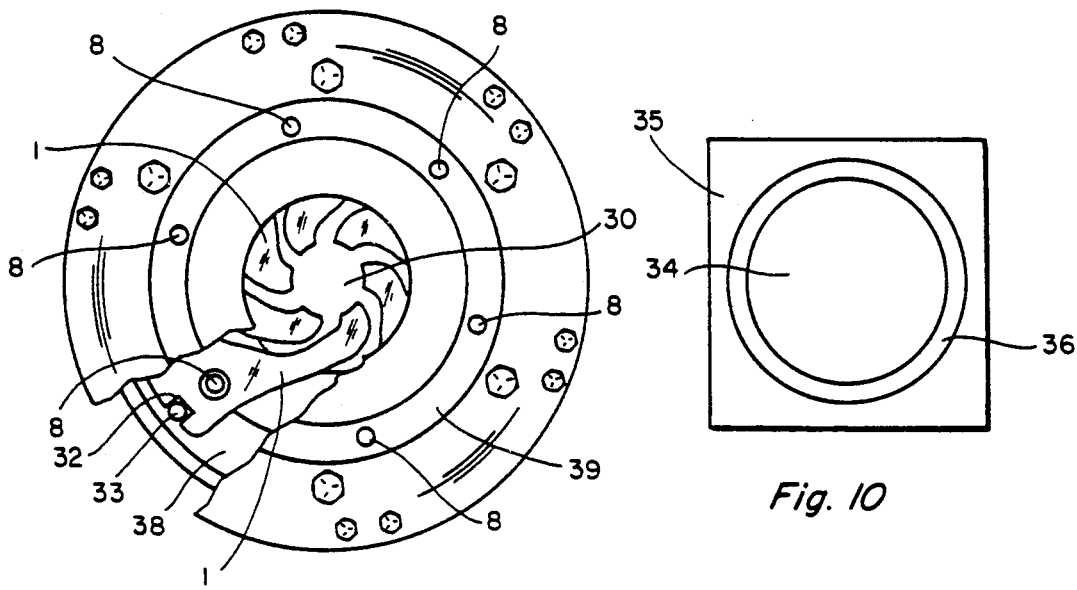
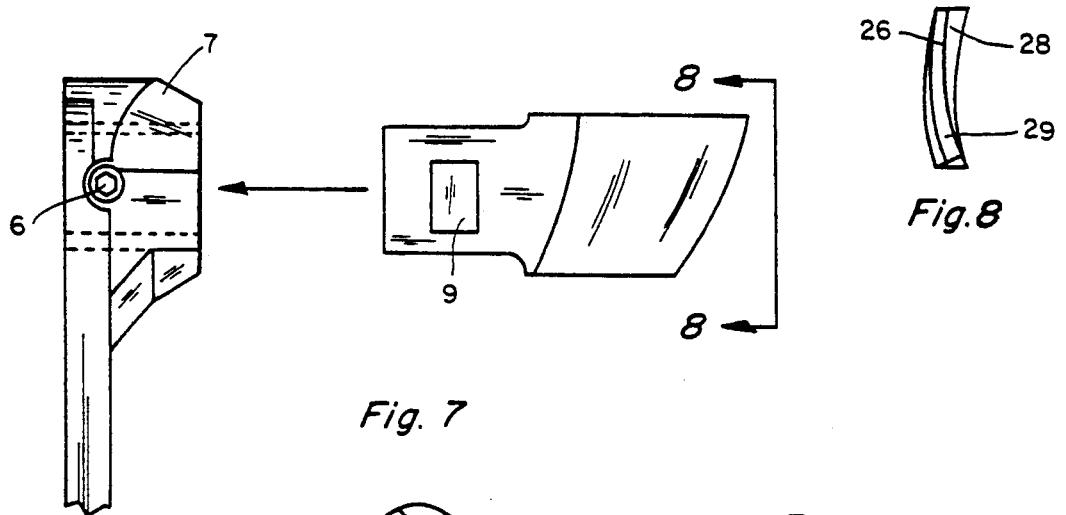
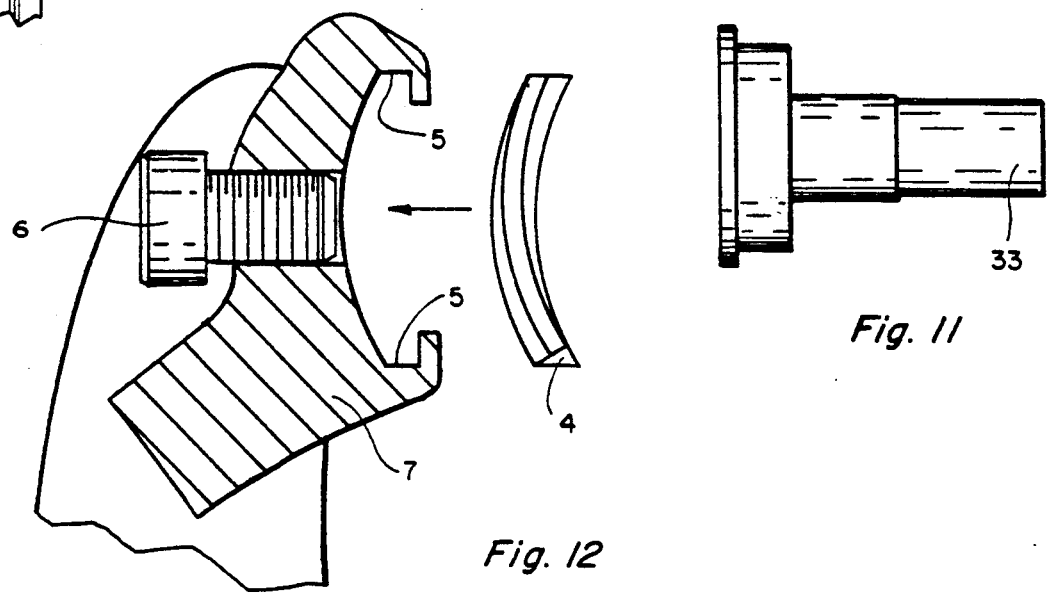

COB CUTTER BLADE AND METHOD OF MANUFACTURE

BACKGROUND OF THE INVENTION

This invention relates to the field of harvester devices, and more particularly to the field of corn cob cutters.

The shucking of corn kernels from corn cobs has been done for over a thousand years. Improvements in the field take place rapidly, the most important improvement being the mechanization of the shucking procedure. Since corn cobs are grown in non-uniform sizes, the art of removing the kernels, while not removing an excessive amount of the corn cob itself, has been the object of much research and development.

The standard corn cutting machine has been well known in the art since the early 1930's. A common corn cutting machine now in service is shown and described in U.S. Pat. No. 2,787,273, issued to C. E. Kerr in 1957. FIG. 7 of the Kerr patent shows the corn cob cutting knife manufactured as one piece. A new and improved design for the knife is the current subject of this patent. This improved design is basically of two-part construction, having a base and a cutting blade insert. The instant cutting blade insert is unique in that the blade insert improves the corn cob cutting performance by changing the position of the knife surface that rides on the cob.

Many cutter knives are in common use throughout the trade and their shape is largely determined by the machines currently in use in the agricultural harvesting of corn. This invention particularly relates to the knife as shown generally in the Kerr Patent, FIG. 7.

Much attention has been drawn to the manufacture of a suitable knife. The sharpness of the knife, as well as the length of service time has been a main object of exploration in this field. Additionally, because corn cobs come in various sizes and are usually tapered within the individual cob itself, there has been a long felt need to develop a knife which will suitably remove the kernels of corn from the cob while not also cutting the cob itself. Cutting the cob itself during the harvesting of corn kernels not only adds unwanted material to the kernel product, it also tends to dull the knife thus requiring frequent sharpening or complete substitution of the knife.

One approach to the problem of dulling the knives is described in the 1989 United States Patent issued to Maruska, patent number 4,802,495. The Maruska patent directed itself to a method and apparatus for renewing cutting edges in corn processing equipment by providing a replaceable blade for the cutting knife. The replaceable blade is held in place by means of a screw and shoe. The shoe is shown and described in FIG. 11 of the '495 patent. However, both Kerr and Maruska fail to solve the problem or rapid dulling of the blade cutting edge or the cutting edge chipping or breaking. The point of the cutting edge cuts the most corn and is damaged or dulled first.

It is an object of this invention to provide a new cob cutting blade which has the added feature of reducing the knife point digging into the cob, therefore increasing blade cutting life. In taking into account the different dimensions of corn ears, a method is described by which a precise radius and angle of taper of the knife are determined so that the optimum attack angles for the knife are produced.

It is also an object of this invention to provide a unique and replaceable cutting blade insert designed so that cutting into the cob itself during the shucking procedure is reduced. It is a further object of this invention to provide a new cob cutting blade insert that will last longer and stay sharper than the conventional knives now in use. It is further an object of this invention to provide a cob cutting blade insert that may be made of high quality steel and yet is economical to manufacture and use in the cob cutting process.

Other and further objects of this invention will become obvious upon reading the following Specification.

BRIEF DESCRIPTION OF THE INVENTION

A cob cutting blade for a cob cutter knife is manufactured using a method which not only describes the manufacture of the actual blade itself, but also provides a method for determining the off-set grinding radius for the ski angle surface.

A three step method describes the manufacture of the knife blade insert. The knife blank has a twenty-five degree angle cut across the upper edge of the blade. The blade itself has a curved cross-section. The inner ski surface is then machined so that an inner off-set, non-concentric surface is produced. The outer surface is then ground in the final step to produce a cutting angle of approximately 8.6 degrees relative to the cob. The 8.6 degree cross sectional cutting angle has been determined to be of an optimum angle for removing corn kernels from a cob.

Since the inner and outer surfaces are machined off-set from the mounting center of the blade, the surfaces of the blade are not concentric. The leading edge of the blade is slightly off-set from the cob surface, resulting in detection of a hard cob surface. A seven step procedure determines the off-set grinding radius for the ski angle. This procedure results in the optimum shape for a blade for removing kernels of corn from various size and geometrically shaped corn cobs.

A new square knife control piece is also provided so as to reduce wear on the knife blade as it pivots about its knife pivot point. This new piece comprises a square bushing which contacts the square knife control slot on the standard knife blade. Inside this bushing is a circular pivot pin which is connected to the standard cob knife driving mechanism.

BRIEF DESCRIPTION OF THE DRAWINGS

FIG. 7 is an exploded view of the end of the cutting blade insert and the cutting blade insert holder.

FIG. 8 is an end view of the cutting blade insert knife edge, taken along lines 8—8 of FIG. 7.

FIG. 9 is a partial cutaway view showing the knife in its environment of use in the standard cob cutting machine.

FIG. 10 is a top view of the knife control unit showing the square control unit and bushing.

FIG. 11 is a side view of the pivot pin used to move the knife blade.

FIG. 12 is an exploded top view of the blade insert and holder showing the tapered-groove holder.

DETAILED DESCRIPTION OF THE PREFERRED EMBODIMENT

Figure 1:
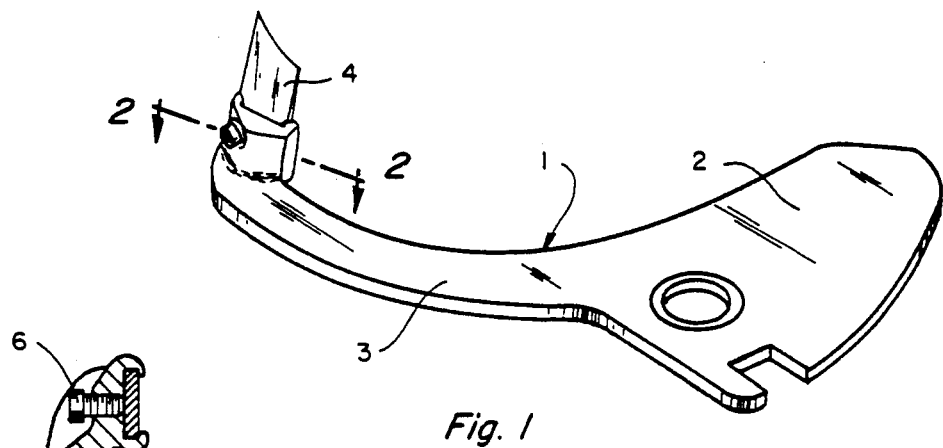
FIG. 1 is a perspective view of the knife and cutting blade insert.
Figure 2:
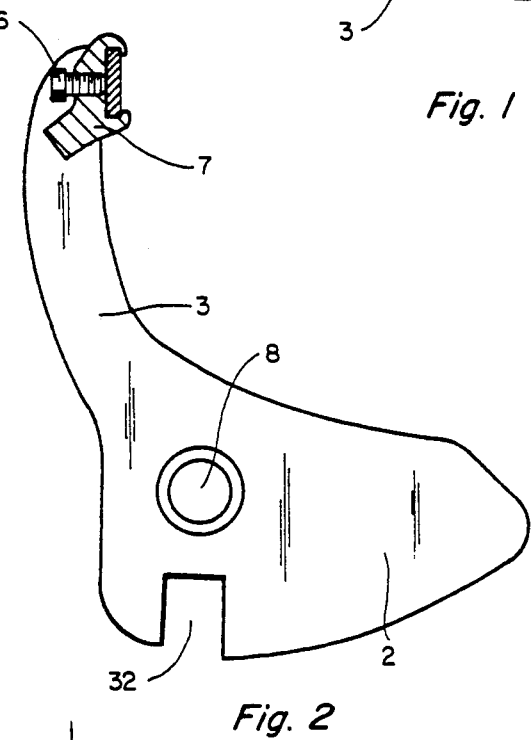
FIG. 2 is a top plan view of the holder and cutting blade insert with the top part of the blade holder in cross section, taken along Lines 2—2 of FIG. 1.

A cob cutter knife 1 comprises generally a base having a counterweight portion 2, a shank portion 3 and a cutting blade insert 4. The removable cutting blade insert 4 is inserted into opposite tapered grooves 5 (shown on FIG. 12) and is locked into position by the set screw 6. The grooves are tapered at an eight (8) degree angle, as shown on FIG. 12. The set screw is preferably of the Allen type and may tighten the cutting blade insert 4 so that it is fixedly secured in place by the tension between the screw 6, the blade and the tapered grooves 5. A blade holder 7 is formed with the counterweight portion 2 and the shank portion 3 in a unitary fashion. The blade holder 7 and cutting blade insert 4 pivot about a point 8. The blade holder and cutting blade insert with their mountings rotate, as shown and described in the Kerr Patent. The knife 1 is placed in its environment of use as best shown on FIG. 9.

Many problems are encountered in the cob cutting trade due to the imperfections in determining the shape of the cutting blade insert and of the cutting angles which are required to optimize the efficiency of the cutting edge. The improved cutting blade insert as shown herein is produced by a unique three step method illustrated in FIGS. 3 through 5.

Figure 3:
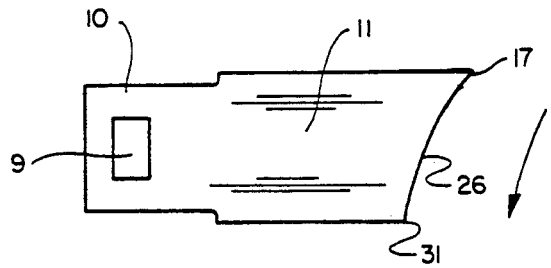
FIG. 3 is a side view of the cutting blade showing the shape of the blade in its initial stages, with an arrow showing the direction of rotation of the blade around the cob.

FIG. 3 shows the side view of the cutting blade insert 4. The removable cutting blade insert 4 has a mounting base 10 and an upper cutting portion 11. The blade is secured when the set-screw 6 is tightened against the set-screw seat 9. The ideal over-all length of the cutting blade insert is approximately 1.25 inches before resharpening. As shown on FIG. 3, the blade cutting edge 26 of the upper cutting portion 11 of the blade is tapered inwardly at an angle of approximately twenty-five degrees as shown. It has been found that this angle of taper should be between 23 degrees and 27 degrees. The lower point 31 does not cut corn unless the cob is very large. In the preparation of a cutting blade insert, it is very important to determine an inner ski angle for the inner surface of the blade which rides on the cob.

Figure 4:
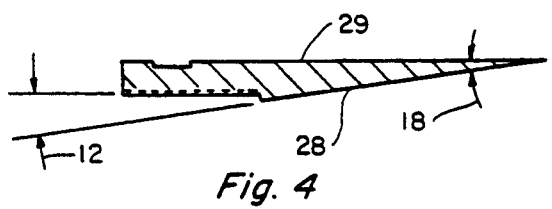
FIG. 4 is a cross sectional view of the cutting blade insert showing the inside ski angle.

FIG. 4 describes the second step in the procedure for producing a properly dimensioned cutting blade for corn kernel removal.

The blade insert 4 has a curvilinear rectangular cross section, as shown on FIG. 12. It is necessary to cut a ski angle in this cross section which creates an inner surface 28 as shown on FIGS. 4 and 8. As best shown on FIG. 4, the cutting blade insert 4 is machined so as to create a ski angle 12 on the inner surface of the blade insert. This machining is accomplished by determining an off-set dimension. Using this off-set dimension, the centerline of the blade insert is off-set from the centerline of the cob and non-concentric off-set surfaces are produced. It has been found that this ski angle 12 operates well at approximately 1.8 degrees. (The drawing shows 6.8 degrees due to 5 degrees on the holder.)

Figure 5:
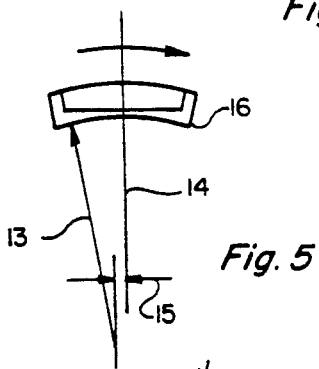
FIG. 5 is an end view of the cutting blade insert showing the off-set radius for the inside ski angle, with an arrow showing the direction of rotation of the blade around the cob.

In the optimum range, the ski radius for the cutting edge, as shown on FIG. 5 is 0.79 inches. In order to taper the cutting edge downwardly and in a curved manner, to create the unique cutting surfaces described herein, the actual grinding radius is off-set approximately 0.015 inches. As shown on FIG. 5, an off-set grinding radius 13 is determined by a unique formula. The center line 14 of the cutting blade insert is used to mount the blade while the off-set grinding dimension 15 is used to cut the inside ski surface 28. During corn cutting the center of the cob is at the center line 14. Using these dimensions, the ski angle for the cutting blade insert is completed. The offset dimension 15 forces the edge 16 of the ski angle to ride on the cob which holds the knife cutting edge point 17 up from the cob.

Turning now to Step 3, a final angle 18 must be ground on the outer surface 29 of the blade. This final angle 18 is approximately 10.5 degrees. This angle 18 is ground into the blade insert by using a second off-set, the manufacturing of which is well known in the art, being identical to the method used in the Kerr knife. Having completed this three step process shown in FIGS. 3 through 5, the knife insert is now ready to be positioned within the holder of the knife itself. The second offset and radius is varied to obtain cutting edge 26 in FIG. 3.

Figure 6:
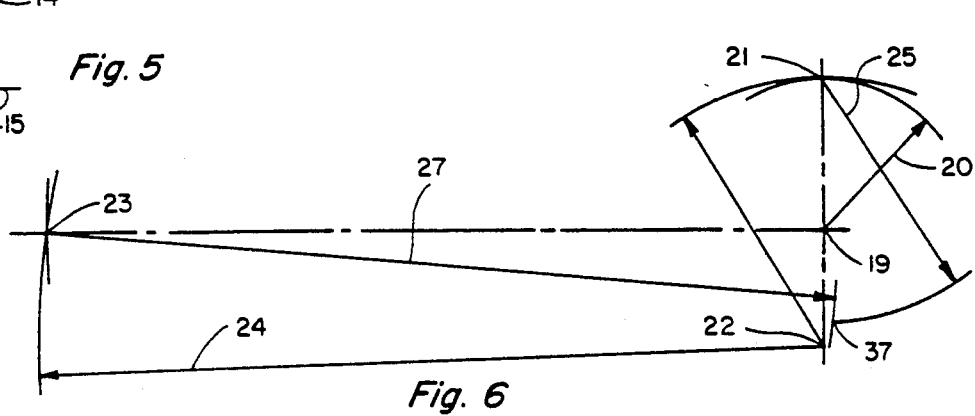
FIG. 6 shows the various measurements used to determine the off-set grinding radius of the inside ski angle.

The diameter of a corn cob varies a great deal due to the natural processes of growing ears of corn. A corn cob will generally vary from between 1 inch to 1 ¾ inches in diameter. Since the cutter knives themselves are normally biased towards a 1 inch diameter, it is necessary for a mechanism, shown and described in the Kerr and other patents, to bias the knives closed. This bias closed, when coupled with the various sizes of the corn cobs, increases the probability of the knife cutting into the cob. The production of a suitable cutting blade insert is an important component in the production of the most efficient cob cutting device. FIG. 6 details a method for determining the most efficient off-set dimension 15 for the ski surface 28. (See FIGS. 4 and 5.

The first step in locating this off-set dimension 15 (FIG. 5) is to draw center lines and arrive at a point of origin 19, shown on FIG. 6. The next step is to draw a 0.500 radius 20 (which represents the diameter for small cobs). This radius intersects the vertical center line at small cob diameter point 21. A large cob diameter point 22 is then located along the vertical center line. This large corn cob diameter point 22 is located by drawing a 0.875 inches radius from point 21 along the vertical center line. The fourth point to be located in this procedure is the location of the knife pivot point 23. A distance having a radius 24 of 2.625 inches from point 22 is now located along the horizontal center line. (A sweet corn cob center is the distance from points 19 to 22.)

The fifth step in determining the off-set radius 13 is done by drawing a 790 inches radius 25 from the small cob point 21. The 0.790 inches radius 25 has been determined to be the optimum for this procedure by past experimental usage and is in common use throughout the industry. A final radius 27 of 2.640 inches (drawn from experimental tests for optimum results) is taken from the knife pivot point 23. The intersection 37 of radius 25 and radius 27 in the lower right quadrant of said centerlines provides off-set 15 in FIG. 5. Off-set 15 is the distance between the intersection of arcs 25 and 27 and the vertical centerline. This method stabilizes the optimum cutting radius for the blade and is used to grind the ski surface 28. This procedure provides the optimum position of the knife cutting edge to follow the 1 inch diameter cob or the 1 ¾ inch diameter cob. The knife cutting edge is moving in and out for the cob diameters and therefore the angular positions vary because the knife rotates about point 23.

The finished blade insert 4 is shown on FIGS. 7 and 8. The blade has an inner cutting surface 28 and an outer surface 29. The top edge 26 of the finished blade shown on FIG. 8 separates the two surfaces. Due to the unique method of grinding, the inner and outer surfaces 28 and 29, and the cutting edge 26 is offset from the cob centerline. This offset feature provides a longer lasting and more reliable cutting blade.

Referring back to FIGS. 1 and 9, the general configuration and shape of the knife 1 is shown. A number of knives, as best shown on FIG. 9, are attached in a circular fashion to form a kaleidoscope type opening 30 for the insertion of an ear of corn. The knife pivots about point 8 and is controlled by a mechanism that is inserted into the arm force square 32. This square 32 controls the opening and closing of the knife through a controlling mechanism. Normally, this arm force square is controlled by a circular pin 33, as shown on FIG. 9. However, it has been found that a circular pin controlling the knife is prone to wear and therefore knife control is lost when used over an extended period of time. This phenomenon occurs because a circular pin only contacts the square force area at its tangential surfaces. Pivot pin 33, FIG. 9, is the point at which the knife is controlled. The knives are driven by pins (at point 8 for each knife) which are attached to a circular plate 37. Another plate 3f contains the control pins 33. As plate 38 moves counterclockwise at a greater rate than plate 37, the knives close.

In order to improve on the effectiveness and life of the control mechanism used to control the knife shank and blade, a square pivot has been developed. This unique square pivot is shown and described in FIGS. 10 and 11. FIG. 10 is a top view of the square pivot. The center 34 of this square, shown in FIG. 10, is adapted to receive the pin 33 (FIG. 11) that controls the knife opening and closing. This square pivot control mechanism comprises a square base 35 and a bushing 36. The pin 33 is driven by the standard driving mechanisms 37 and 38 for corn cob cutter machines in a manner that is well known in the art. The pin 33, which has a circular cross section, is inserted into the center of the square bushing 34 and the square bushing is forced in the normal direction. Forcing the square bushing will pivot the knife about pivot point 8, thus opening or closing the knife about the corn cob.

Since our knife comprises a base and a removable blade, different types of material may be used in the construction of the different parts of the knife 1. Better tool steel may now be utilized for the removable blade, thus prolonging the sharpness and useful life of the blade insert. The knife shank 2 may be made of standard stainless steel material. However, with a cutting blade insert, a more expensive and longer lasting type of steel material may be utilized for the small removable blades. With a cutting blade insert, manufacture is possible with the high strength tool steel or other materials. This type of steel is manufactured by the Teledyne Company. 17-4 stainless steel, which is less expensive, yet as useful, for the base, makes up that portion of the knife. The common types of steel in use for making other knives are A-2 steel and S-2 steel, depending on the application. In the other applications for the manufacture of knives a compromise between the high grade steel needed for the cutting blade and the less expensive steel needed for the base is necessary. In the instant case, a much higher grade steel may be used for the cutting blade since the construction is not unitary. In addition, the manufacturing cost is less with the cutting blade insert.

It has been found that the higher grade steel used in the instant removable cutting blade will increase the life span and sharpness of the removable blade herein by approximately 40%. Additionally, due to the unique design and placement of the instant cutting blade, the leading point of the blade does not dig into the cob and thus there is less breakage and other unwanted material shucked from the cob. A unique feature herein is that the leading point of this blade is off-set slightly from the corn cob surface thus reducing breakage and other damage.

Having fully described my new invention, I claim:

1. A method to determine the off-set grinding dimension for a non-concentric cutting blade insert comprising the steps of:
   1. drawing initial perpendicular vertical and horizontal center lines to determine a point of origin at the intersection;
   2. intersecting the vertical centerline axis at the small cob diameter point by drawing a first arc having a 0.500 inch radius from the point of origin;
   3. locating the large cob diameter point by intersecting the vertical centerline with a second 0.875 line arc having its center at said small cob diameter point;
   4. locating the knife pivot point on the horizontal center line by drawing a third arc having a radius of 2.625 inches from said large cob diameter point;
   5. drawing a fourth arc having a radius of 0.790 inches having its center at said small cob point;
   6. drawing a fifth arc having a radius of 2.640 inches having its center at said knife pivot point and intersecting said fourth arc in the lower right quadrant of said center lines;
   7. measuring the distance between the intersection of said fourth and fifth arc and said vertical center line.

2. A cutting blade insert for a corn cutter knife for cutting kernels from a cob, comprising a lower blade mounting base and an upper cutting portion having a curvilinear cross-section, wherein said upper cutting portion comprises:
   (a) an off-set, non-concentric outer surface;
   (b) an upper continuous curvilinear cutting edge having a lower leading point and an upper knife cutting edge point wherein said upper cutting edge is off-set and non-concentric from said lower curvilinear base portion;
   (c) an off-set, non-concentric continuous curvilinear inner ski surface;
   whereby said off-set, non-concentric continuous curvilinear inner ski surface rides on the cob and holds the cutting edge up from said cob.

3. A cutting blade insert for a corn cutter knife for cutting kernels from a cob as in claim 2, wherein the outer and inner ski surfaces and the upper top edge of said blade insert is off-set approximately 0.015 inches for the curvilinear surfaces of the lower base of said blade.

4. A cutting blade insert for a corn cutter knife for cutting kernels from a cob as in claim 2, wherein said upper cutting edge and said inner ski surface are off-set 0.015 inches form the curvilinear surfaces of the lower base of said blade.

5. A cutting blade insert for a corn cutting knife for cutting kernels from a cob as in claim 2, wherein said blade is detachably removably and replaceable by means of a setscrew and tapered grooves which receive said blade insert.

6. In a knife for cutting corn having two angular surfaces on the side next to the cob, the apex of such angular surfaces forming a heel portion which holds the cutting edge from contact with the corn cob, the improvement comprising:

having the upper cutting portion of said knife formed so that the top edge and inner ski surface of said knife are continuous, curvilinear and non-concentric to the lower knife base.

* * * * *